March 17, 1925.
P. R. GLASS
FASTENER INSERTING MACHINE
Original Filed May 20, 1920
1,529,695
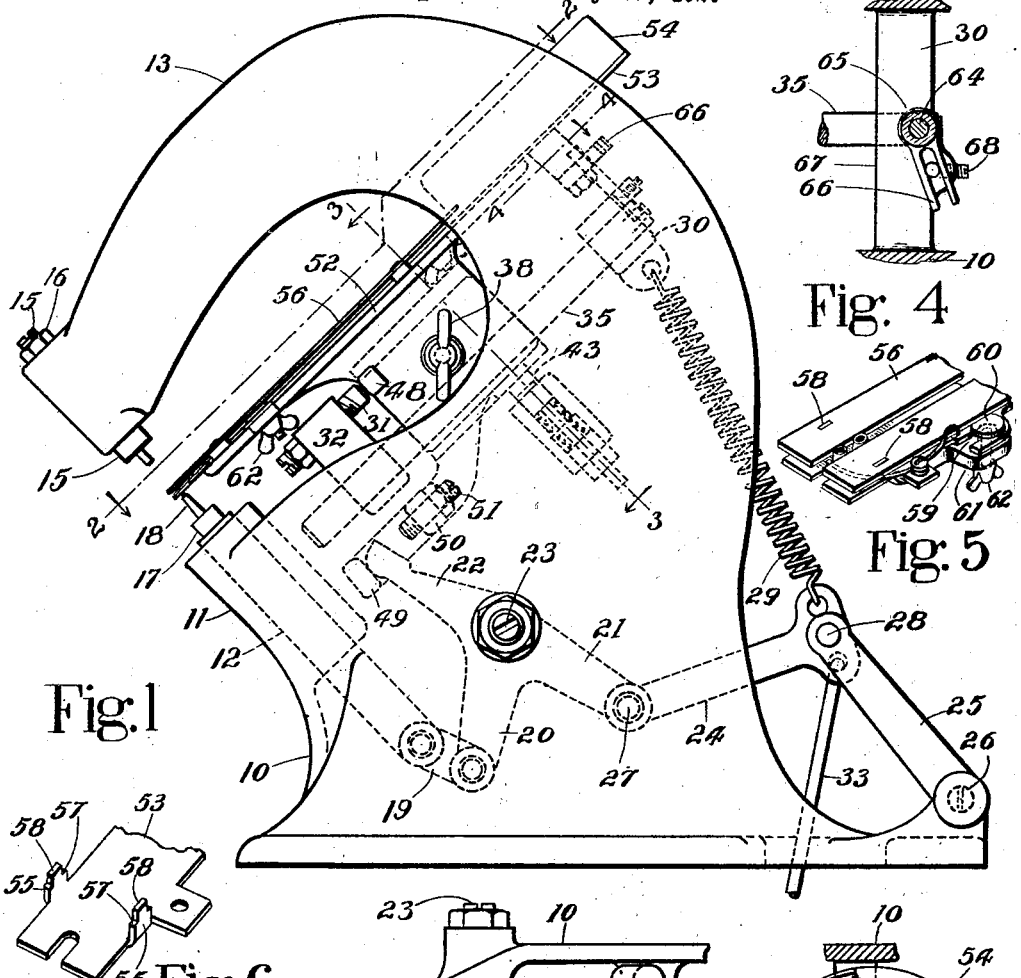
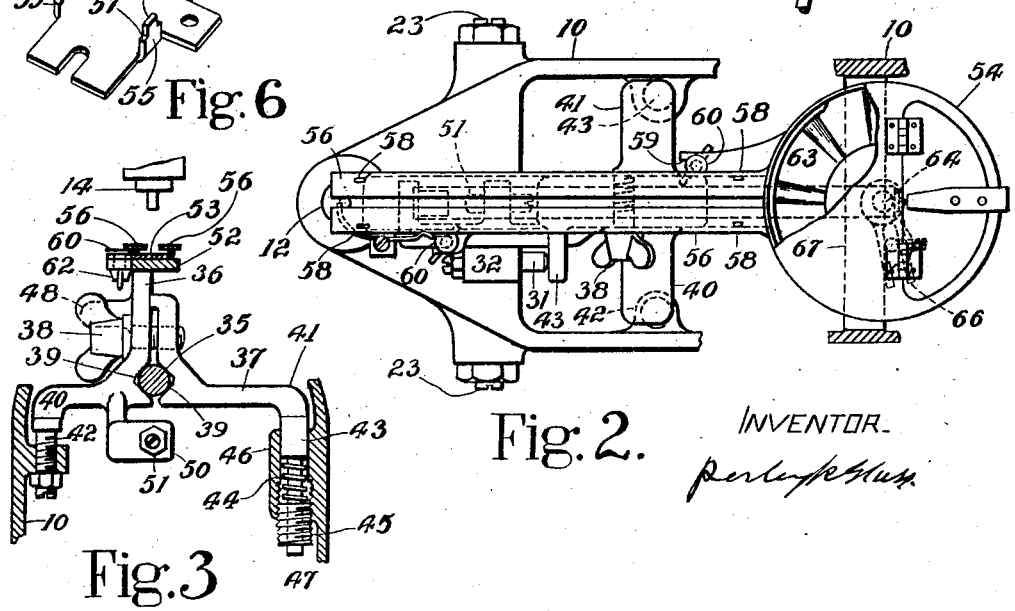
INVENTOR
Perley R. Glass Patented Mar. 17, 1925.

1,529,695

UNITED STATES PATENT OFFICE.

PERLEY R. GLASS, OF WAYLAND, MASSACHUSETTS, ASSIGNOR TO UNITED SHOE MACHINERY CORPORATION, OF PATERSON, NEW JERSEY, A CORPORATION OF NEW JERSEY.

FASTENER-INSERTING MACHINE.

Application filed May 20, 1920, Serial No. 382,872. Renewed October 9, 1923.

*To all whom it may concern:*

Be it known that I, PERLEY R. GLASS, a citizen of the United States, residing at Wayland, in the county of Middlesex and State of Massachusetts, have invented certain Improvements in Fastener-Inserting Machines, of which the following description, in connection with the accompanying drawings, is a specification, like reference characters on the drawings indicating like parts in the several figures.

This invention relates to fastener inserting machines such as those used for inserting eyelets or other fasteners in shoe uppers and other articles. According to one aspect an object of the invention is to provide a machine of relatively small cost without sacrificing accuracy or efficiency. By way of illustration the drawings represent a machine adapted to be operated by a treadle but it will be apparent that the several features hereinafter set forth may be embodied with equal utility in machines operated by factory power.

One particular object of the invention is to provide improved means for supporting and reciprocating the raceway by which the fasteners are supplied to the setting or inserting mechanism. It is necessary, from time to time, to change from fasteners of one size to those of another, and since the raceway is not generally usable for fasteners of more than one side it is necessary to take off one raceway and substitute another whenever fasteners of a different size are required. Accordingly a feature of the invention consists in an improved raceway carriage and improved means for attaching the raceway to it so that various raceways may be interchanged without disturbing the carriage or its operating mechanism. In this respect the invention consists in improved means for mounting the carriage so that its connection with the machine will be separate and distinct from the means employed for securing the raceway to the carriage.

Another object of the invention is to provide improved means for adjusting the raceway so that it will register with the tool by which the fasteners are taken from it. For this purpose the raceway is mounted so as to be adjustable angularly about an axis in addition to being otherwise movable to present fasteners successively to the aforesaid tool. Another feature of the invention relating to this aspect of the invention consists in constructing the aforesaid adjusting means so as to maintain a frictional holding effect on the carriage whereby the desired timing of the movements of the raceway will be insured.

Another object is to provide a raceway and hopper of relatively light construction and small cost in conjunction with reinforcing means whereby each raceway and hopper, on being attached to the machine, will be braced adequately to counteract the lightness of construction. In this respect a feature of the invention consists in providing a raceway-carriage to which any one of a set of combined raceways and hoppers may be readily attached, and which embodies a construction that affords the desired reinforcement to the raceway hopper. This feature makes it feasible to construct the raceway and hopper of light ductile sheet metal which reduces their cost of manufacture so that the saving is proportional to the number of raceways included in a set furnished for each machine.

Other features of the invention are illustrated by the drawing and are hereinafter described and claimed.

Referring to the drawings,

Fig. 1 represents a side elevation of a fastener inserting machine the several movable elements of which are shown in their initial positions;

Fig. 2 represents a fragmentary view of the structure below the line 2—2 of Fig. 1;

Fig. 3 represents a section through the structure intersected by line 3—3 of Fig. 1;

Fig. 4 represents a section through the structure intersected by line 4—4 of Fig. 1;

Fig. 5 is a perspective view of a portion of the raceway including its delivery end; and Fig. 6 is a perspective view of a fragment of the base plate of the raceway at its delivery end.

The frame 10 of the machine is provided with a bearing 11 for a plunger 12, and is further provided with an overhanging horn 13 in which a clenching tool 14 is fixed. This tool is provided with a screw-threaded shank 15 by which it may be adjusted lengthwise, a binding nut 16 being provided to preserve the adjustment.

The plunger 12 carries an inserting tool comprising a base portion 17 and a spring-pressed spindle 18 of well-known construction. A link 19 connects the lower end of the plunger with an arm 20 of a lever having two other arms indicated at 21 and 22. This three-armed lever is pivotally mounted on a pair of studs one of which is indicated at 23, these studs being screwed into the frame at opposite sides and entering sockets formed in the hub of the lever. As shown by Figs. 2 and 3 the frame is in the form of a shell and includes nearly all the moving parts with the exception of toggle links 24 and 25. Link 25 is anchored to the base of the frame by a pivot member 26 while the link 24 is connected to the arm 21 by a pivot member 27. The two links are connected by a pivot member 28, link 25 being in the form of a fork so as to straddle the link 24. A tension spring 29 is hooked through an eye of link 24 and through an eye in a stationary cross-piece 30 of the frame, and normally maintains the movable elements in the positions shown. The limits to which the moving parts are permitted to move under the influence of the spring are all determined by a stop screw 31 which is adjustably mounted in a stationary cross-piece 32 of the frame. The link 24 is provided with an eye for the reception of a treadle rod 33, the disposition of said rod being such that downward movement thereof will straighten the toggle members 24 and 25 and thereby impart motion to all the moving parts of the machine.

The carriage for the raceway comprises a cylindric rod 35 and co-operative members 36 and 37 formed and arranged to clamp the rod in the relation shown by Fig. 3, a wing bolt 38 being provided to produce the clamping effect. In order to avoid the necessity of machining the members 36 and 37 and to provide firm connection with the rod 35 said members are cast or forged in such form as to provide V-shaped grooves 39 for the reception of the rod. The stationary cross-pieces 30 and 32 of the frame are bored to provide bearings for the rod 35, said bearings being sufficiently far apart to admit between them the clamping portions of the carriage members 36 and 37 in addition to the space necessary to accommodate the movements of the carriage lengthwise of the axis of the rod. In consequence of the groove construction a single screw or bolt is sufficient to maintain the rod and the members 36 and 37 rigidly in assembled relation so that they become, to all intents and purposes, a movable unit, and the operation of assembling them or taking them apart is reduced to the least possible work.

The members 36 and 37 are provided with wing portions 40 and 41 respectively, the portion 40 being arranged to bear and slide on an adjusting screw 42, while the wing 41 is arranged to bear and slide on a spring-pressed plunger 43. This screw and the plunger are arranged in portions of the frame 10 at opposite sides of the longitudinal vertical plane of the rod 35, the plunger maintaining upward pressure against the wing 41 and thereby maintaining downward pressure of the wing 40 on the screw 42. Whenever the screw is adjusted the plunger 43 advances or recedes, as the case may be, and thereby maintains control of the carriage with respect to angular motion about the axis of the rod 35. This adjustment serves to shift the raceway laterally for the purpose of registration with the inserting tool. The plunger 43 is under the stress of a compression spring 44, the latter being maintained under compression by a screw-threaded sleeve 45 screwed into a boss 46 in which the plunger slides, and at the same time affords a bearing for the stem 47 of the plunger. The plunger 43 maintains frictional resistance to movement of the carriage lengthwise of the rod 35 not only by its contact with the wing 41 but also by maintaining pressure of the wing 40 on the screw 42. This serves to control the lengthwise movements of the carriage notwithstanding the fact that the latter is arranged to travel an inclined path. In practice the friction so applied serves to maintain the carriage in each of its extreme positions during the intervals of lost motion between it and the arm 22 by which it is moved toward and from delivering position. The degree of friction may be varied by adjusting the sleeve 45 so as to compress the spring 44 more or less.

A horn 48 formed on the carriage is arranged to abut against the set screw 31 to determine the delivering position of the raceway. The carriage is further provided with two confronting lugs 49 and 50 between which the operating arm 22 plays back and forth with lost motion the extent of which may be varied by an adjustable screw 51 carried by the lug 50. As hereinbefore stated the stationary screw 31 determines the forward position of the carriage and may be adjusted so as to register the delivery end of the raceway with the inserting tool. This, then, is the factor that determines the initial positions of the movable elements of the machine. The lost motion of the arm 22, when the latter is moving from the lug 49 to the screw 51, enables the spindle 18 to enter the leading eyelet in the raceway before the retractory movement of the latter begins, while the screw 51 provides for timing the beginning of such retractory movement relatively to the movement of the inserting tool. When the elements start to return to their initial positions the raceway carriage remains in its fully retracted position, under control of the friction elements 42 and 43, during the first stages of downward movement of the inserting tool. This also is due to the lost motion of the arm 22 between the abutments 49 and 51, and enables the spindle 18 to clear the new leading eyelet as the raceway returns to its initial position.

The member 36 of the carriage is provided with a flat elongated portion 52 as a table or platform to reinforce the attached raceway. The latter, as shown, comprises a flat base plate 53 the upper end portion of which is of a form and size such as to provide a bottom for the hopper through which the fasteners are supplied to the raceway. The hopper includes also an inverted cup-shaped member 54 which is preferably of ductile sheet metal stamped and affixed to the base plate 53 by any suitable or preferred means. The base plate also is preferably stamped from ductile sheet metal and is provided with ears 55 at its longitudinal edges to afford supports for the guiding strips or plates 56, 56. These ears are bent upwardly as shown best by Fig. 6, and are provided with shoulders 57 on which the strips 56 are seated. The reduced portions 58 of the ears are passed through holes in the strips 56 and are headed over or riveted. The base plate is further provided with notches 59 to receive the shanks of clamping bolts 60. These bolts are arranged loosely in ears 61 formed on the carriage portion 52 and are provided with wing nuts 62 by which their heads may be drawn downwardly to clamp the raceway to the carriage. When the clamping members are relaxed the raceway may be attached and detached by movement edgewise of the base-plate, but it is not necessary to remove the nuts 62 from their bolts. It is to be observed that the two clamping bolts by which the raceway is detachably secured to its carriage are separate and distinct from the operating mechanism and have no effect in respect to maintaining the component parts of the carriage in assembled relation. Consequently the operation of taking off or putting on a raceway does not disturb the carriage mountings or the operating mechanism.

The table portion 52 of the raceway carriage extends throughout almost the entire length of the raceway and also under a substantial part of the hopper in order to reinforce the base-plate 53, especially at the junction of the hopper and raceway. This feature of the carriage makes it feasible to construct the raceways of thin sheet-metal parts as described, and does away with the necessity of providing each one with a relatively heavy and costly base of cast iron as heretofore.

The hopper is provided with an oscillatory brush 63 of well-known construction. It is affixed to a rock-shaft 64 which is journaled in a bearing sleeve 65 fixed to the base-plate 53. A forked arm 66 affixed to the lower end of the rock-shaft straddles a stationary pin 67 which, in the present instance, is affixed to the frame portion 30 by a set screw 68. As the raceway moves endwise the forked arm 66 plays back and forth on the stationary pin 67 and is thus oscillated to operate the brush 63, the fasteners in the hopper being thereby agitated and caused to escape in well-known manner through an outlet port in registration with the slot formed by the confronting edges of the guide strips 56.

Having thus described my invention, what I claim as new and desire to secure by Letters Patent of the United States is:

1. A fastener-inserting machine comprising a fastener-inserting tool, and a raceway adjustable about an axis to register the leading fastener relatively to the inserting tool, the raceway being movable lengthwise of said axis to present fasteners successively to said tool.

2. A fastener-inserting machine comprising a fastener-inserting tool, a raceway adjustable lengthwise and angularly with respect to an axis, so as to register the leading fastener relatively to said tool, and means arranged to reciprocate the raceway so as to present fasteners successively to said tool.

3. A fastener-inserting machine, comprising a fastener-inserting tool, a raceway adjustable lengthwise and angularly with respect to an axis at right angles to that of the inserting tool so as to register the leading fastener relatively to the tool, and means arranged to reciprocate the raceway so as to present fasteners successively to the tool.

4. A fastener-inserting machine comprising a fastener-inserting tool, and a raceway movable lengthwise to present fasteners successively to said tool and adjustable about an axis substantially parallel to its length so as to register the leading fastener relatively to the inserting tool.

5. A fastener-inserting machine comprising a fastener-inserting tool, a raceway-carriage having means for detachably securing a raceway, said carriage being adjustable about an inclined axis so as to register the raceway laterally with respect to the inserting tool, and means arranged to reciprocate the carriage lengthwise of said axis so as to present fasteners successively to the inserting tool.

6. A fastener-inserting machine comprising a fastener-inserting tool, a raceway for supplying fasteners, a raceway-carriage arranged to execute rectilinear movement lengthwise of an axis to present fasteners successively to said tool, the raceway being laterally adjustable about said axis to rectify inaccurate register with said tool.

7. A fastener-inserting machine comprising a fastener-inserting tool, a raceway-carriage, said carriage being arranged to execute movement lengthwise of an axis to present fasteners successively to said tool, and means constructed and arranged to adjust the carriage angularly about said axis and to impose friction on the carriage such as to oppose said lengthwise movement.

8. A fastener-inserting machine comprising a fastener-inserting tool, a raceway-carriage, spring-stressed means arranged to urge the carriage to turn about an axis, an adjustable stop arranged to oppose such turning so as to register the raceway relatively to said tool, and means arranged to reciprocate the carriage otherwise than about said axis to present fasteners successively to said tool.

9. A fastener-inserting machine comprising a fastener-inserting tool, a raceway-carriage, means arranged to impart rectilinear movement to said carriage to present fasteners successively to said tool, spring-stressed means arranged to urge the carriage to turn about an axis parallel to such rectilinear movement, and an abutment arranged to engage the carriage so as to oppose such turning and thereby to register the raceway relatively to said tool.

10. A fastener-inserting machine comprising a fastener-inserting tool, a raceway-carriage and mechanism for operating it so as to present fasteners successively to the inserting tool, a raceway secured to said carriage, and means for adjusting the carriage transversely of its path of movement to register the raceway relatively to said tool.

11. A fastener-inserting machine comprising a fastener-inserting tool, a raceway for supplying fasteners thereto, a carriage for said raceway, means for securing the raceway to the carriage, means for operating the carriage so as to present fasteners successively to said tool, and means for adjusting the carriage so as to register the raceway relatively to said tool.

12. A fastener-inserting machine comprising a fastener-inserting tool, a raceway for supplying fasteners thereto, a carriage for said raceway, means for reciprocating the carriage so as to present fasteners successively to said tool, and means for adjusting the carriage so as to shift the raceway transversely of the lines of reciprocation.

13. A fastener-inserting machine comprising a frame, a fastener-inserting tool, a slidable carriage, means fixed relatively to the frame for guiding said carriage, a raceway secured to said carriage for supplying fasteners to said tool, means for reciprocating the carriage to present fasteners successively to the tool, and means arranged to adjust the carriage so as to register the raceway relatively to the inserting tool.

14. A fastener-inserting machine comprising fastener-setting mechanism, a raceway for presenting fasteners thereto, a carriage for carrying the raceway to and from presenting position, said carriage including a slide-member and two clamping members arranged to clamp the slide-member, means arranged to cause the clamping members to clamp the slide-member so as to maintain the three said members in assembled relation, means for securing the raceway to one of said clamping members, and means for guiding the slide member.

15. A fastener-inserting machine comprising fastener-setting mechanism, a frame having a cylindric bearing, a cylindric rod arranged to slide in said bearing, two cooperative clamping members having grooves to receive said rod, means for causing said clamping members to clamp the rod so as to keep them and the rod in assembled relation, a raceway fastened to one of said clamping members to present fasteners to the setting mechanism, means for reciprocating the assemblage including the rod and clamping members so as to shift the raceway to and from presenting position, and means for adjusting said assemblage angularly about the axis of said rod to insure registration of the raceway with the setting mechanism.

16. A fastener-inserting machine comprising fastener-setting mechanism, a frame having two separated cylindric bearings in coaxial relation, a cylindric rod arranged to slide in said bearings, means detachably fastened to said rod between said bearings for carrying a raceway, a raceway fastened to said carrying means to present fasteners to the setting mechanism, means for reciprocating the assemblage including said rod and carrying means so as to shift the raceway to and from presenting position, and means for controlling said assemblage with respect to turning about the axis of said rod, so as to insure registration of the raceway with the setting mechanism.

17. A fastener-inserting machine comprising a raceway having a base-plate, a raceway carriage having a platform to engage and support said base-plate, and means arranged to clamp said base-plate against said platform, said raceway being detachable from said carriage by movement edgewise of said base-plate when said clamping means is relaxed but in position to function if tightened.

18. A fastener-inserting machine comprising fastener-setting mechanism, a raceway-carriage, a raceway having a base-plate of ductile sheet-metal portions of which are bent upwardly and formed with shoulders, slot-forming strips carried by said upwardly bent portions having holes through which said portions extend, said shoulders being arranged to space the strips from the base-plate, means for securing said base-plate to the carriage, and means for operating the carriage to shift the raceway to and from the setting mechanism.

19. A fastener-inserting machine comprising fastener-inserting mechanism, a raceway and hopper for supplying fasteners thereto, and comprising a base-plate forming the bottom of the raceway and the bottom of the hopper, a raceway carriage having an elongated table portion constructed and arranged to brace the raceway portion and the hopper portion of said base-plate relatively to each other, means for securing said base-plate to said table portion, and means for operating the carriage so as to shift the raceway to and from the setting mechanism.

20. A fastener-inserting machine comprising fastener-inserting mechanism, a raceway and hopper having a base-plate one portion of which forms the bottom of the raceway and another portion of which forms the bottom of the hopper, a carriage for presenting the delivery end of said raceway to said mechanism, said carriage having a platform to support said base-plate, and means for clamping the base-plate to the platform, the contacting portions of said platform and base-plate being arranged to brace the hopper and the raceway relatively to each other.

21. A fastener-inserting machine comprising a frame, a fastener-inserting tool, a raceway unit, a rod connecting said raceway unit and said frame, mechanism for reciprocating said raceway unit in lines parallel to the axis of said rod, and means directly engaging said frame and said raceway unit to adjust the latter about the axis of said rod for the purpose of registering the raceway with said tool.

22. In a fastener-inserting machine of the type that includes a frame, a fastener-inserting tool, and operating mechanism, the combination of a raceway unit comprising a raceway, a holder therefor having a groove, a cylindric rod arranged in said groove, and means for clamping said holder and rod together rigidly, said rod being arranged in a bearing in said frame, said raceway unit being movable lengthwise of the axis of said rod by said operating mechanism to cooperate with said tool, and means for adjusting said unit about the axis of said rod to register the raceway with said tool.

23. A fastener-inserting machine comprising a fastener-inserting tool, a raceway structure adjustable about an axis and otherwise movable, mechanism for reciprocating said raceway structure otherwise than about said axis to present fasteners to said tool, said raceway structure and said mechanism being organized to provide for lost motion on the part of the latter, and friction means arranged to insure such lost motion and to adjust said raceway structure about said axis.

24. A fastener-inserting machine comprising a fastener-inserting tool, a raceway carriage adjustable about an axis and otherwise movable, a raceway affixed to said carriage, mechanism for reciprocating said carriage otherwise than about said axis to present fasteners to said tool, and means for adjusting said carriage angularly about said axis to insure register of the raceway with said tool.

25. A fastener-inserting machine comprising a stationary support, a fastener-inserting tool, a raceway structure, pivot means connecting said raceway structure to said support, means for adjusting said raceway structure about the axis of said pivot means to register the raceway with said tool, and mechanism for reciprocating said raceway structure lengthwise of said axis to present fasteners to said tool.

In testimony whereof I have signed my name to this specification.

PERLEY R. GLASS.